United States Patent [19]
Burns et al.

[11] Patent Number: 4,813,006
[45] Date of Patent: Mar. 14, 1989

[54] ANALOG-DIGITAL CORRELATOR

[75] Inventors: Richard J. Burns, Canoga Park; Kenneth R. Grim, Moorpark; Miguel E. Levy, Camarillo, all of Calif.

[73] Assignee: Hughes Aircraft Company, Los Angeles, Calif.

[21] Appl. No.: 67,193

[22] Filed: Jun. 29, 1987

[51] Int. Cl.⁴ .................... G06J 1/00; G06F 15/336
[52] U.S. Cl. .................... 364/604; 342/189; 342/378; 364/728.03
[58] Field of Search .............. 364/604, 728, 819, 728.03–728.07; 342/159, 189, 201, 378–384; 375/1, 96, 115

[56] References Cited

U.S. PATENT DOCUMENTS

| | | | |
|---|---|---|---|
| 4,295,204 | 10/1981 | Sunstein | 364/604 X |
| 4,346,475 | 8/1982 | Alexis | 364/604 X |
| 4,370,726 | 1/1983 | Caracappa | 364/604 |
| 4,400,790 | 8/1983 | Chambers et al. | 364/604 |
| 4,543,640 | 9/1985 | Coutures | 364/604 |
| 4,547,864 | 10/1985 | Kawabata | 364/604 X |

Primary Examiner—Joseph Ruggiero
Attorney, Agent, or Firm—R. A. Hays; M. W. Sales; A. W. Karambelas

[57] ABSTRACT

An analog-digital correlator 10 utilizes a plurality of sample and hold cirucits 16-0 to 16-(M-1) to directly store samples of a received analog signal. Bits of a correlation pattern are shifted through stages in a correlation pattern shift register 26. The state of the correlation pattern bits causes the value in the associated sample and hold circuit 16 to either be inverted or noninverted when it is summed with other similarly generated signals from the remaining sample and hold circuits to form the correlation output sum by network 30. The output of network 30 will peak when the bits of the digital correlation pattern signal are shifted to stages in register 26 that are aligned with the sample and hold circuits containing the digitally-impressed code of interest. In the preferred embodiment, a mask shift register 28 is used to selectively disable certain of the sample and hold circuits from affecting the correlation output sum. To this end, mask bits corresponding to the length of the digitally-impressed code are shifted through mask register 28 simultaneously with the correlation pattern bits in register 26.

1 Claim, 2 Drawing Sheets

ANALOG-DIGITAL CORRELATOR

BACKGROUND OF THE INVENTION

1. Technical Field

This invention relates to cross-correlation circuits and, more particularly, to techniques for determining correlation between an analog signal and a preselected code.

2. Discussion

Analog-digital cross-correlator networks are used in a variety of applications where it becomes necessary to determine whether a received analog signal contains a preselected pattern. For example, pulse compression techniques used in radar systems impress a digital code onto the signal which is transmitted. The radar receiver includes a cross-correlator for determining when the echo contains this digital code. The echo is in the form of an analog signal whose voltage typically has positive and negative polarities determined by the digital ones and zeros of the impressed code. Among the tasks of the cross-correlator is to determine whether the echo contains this predetermined pattern. If so, useful information such as the range, speed, etc. of the target can be determined.

One known cross-correlator is implemented by digitizing the received analog signal and performing the well known cross-correlation sum digitally. While this technique can be carried out in a relatively straight forward manner, this all digital approach can be costly because high speed digitizers are difficult to build, as well as usually being physically large and expensive. Another prior implementation makes use of a charged coupled device (CCD). In this application, the CCD is used initially as a serial analog memory and then as a tapped analog shift register to perform the cross-correlation sum. The pattern against which the analog samples are correlated is determined by the length of the CCD output tapped electrodes. This implementation likewise suffers from several disadvantages. The accuracy of this approach is degraded because the samples are read in serially causing some information to be lost during each shift through the CCD stages. A high sample input rate can also result in stringent requirements for the CCD clock driver circuits. The clock drivers then can be difficult to produce and, hence, costly. In addition, CCD implementations tend to have large DC offsets which have to be compensated for by additional circuitry. One major disadvantage is that the cross-correlation code is hard wired into the CCD and therefore it is not programmable. This can cause problems when the code must be kept secret, such as in military applications. Another disadvantage is that the manufacturing process for CCD's generally requires specialized fabrication techniques which can result in availability and cost problems.

Other implementations that would make use of more easily fabricated charge transfer devices (e.g., bucket brigades) normally do not operate at sufficiently high input sample rates that are required in many applications such as the pulse-compression radar application noted above.

Still other implementations utilize surface acoustic wave (SAW) devices. The SAW device implementation, as with the CCD approach, has the correlation code built in resulting in nonprogrammability. Costs and availability are also a problem with SAW devices. Generally, the SAW device must operate with a fixed data rate established by the velocity of the surface acoustic waves. In a radar pulse-compression application, SAW devices operate at high IF frequencies rather than at video levels and tend to have insertion losses which must be compensated for by additional circuitry.

SUMMARY OF THE INVENTION

According to the teachings of the present invention, the received analog signal is sampled and values of the sample are stored directly in individual nondestructive memories. The digital code is then shifted through a shift register that has a plurality of stages, each stage being associated with a particular memory. The values of the code in each shift register stage and the samples in the memory cooperate to generate a cross-correlation sum which can be used to detect correlation between the code and the received analog signal.

Among the advantages of this approach is that the analog samples are not degraded by multiple transfers as generally occurs if a serial analog memory is used. In addition, the digital correlation code can be changed by shifting new codes into the shift register. The present invention can also be fabricated on a minimum number of monolithic integrated circuits manufacturable by existing and widely available integrated circuit fabrication processes.

DESCRIPTION OF THE DRAWINGS

These and various other advantages of the present invention will become apparent to those skilled in the art upon reading the following specification and by reference the drawings in which.

DESCRIPTION OF THE PREFERRED EMBODIMENT

With reference now to the drawings, the cross-correlator 10 includes an analog input bus 12 for receiving an analog signal of interest. By way of a nonlimiting example, the received input signal is the echo received by a radar antenna (not shown) in a system in which the transmitted signal has been impressed with a digital pulse code. Such systems are well known in the art as exemplified by U.S. Pat. No. 4,196,435 to Phillips Jr. entitled "Radar Pulse Phase Code System", which is hereby incorporated by reference.

By way of a simplified example, assume that the transmitted radar signal was impressed with a code having a digital pattern of 101. If this transmitted signal strikes a target and rebounds towards the antenna, the received analog signal will contain voltage levels having a pattern of positive, negative and positive corresponding to the 101 digitally-impressed code thereon. It is the task of the correlator 10 to determine if the received analog signal contains this code.

Figure 1:
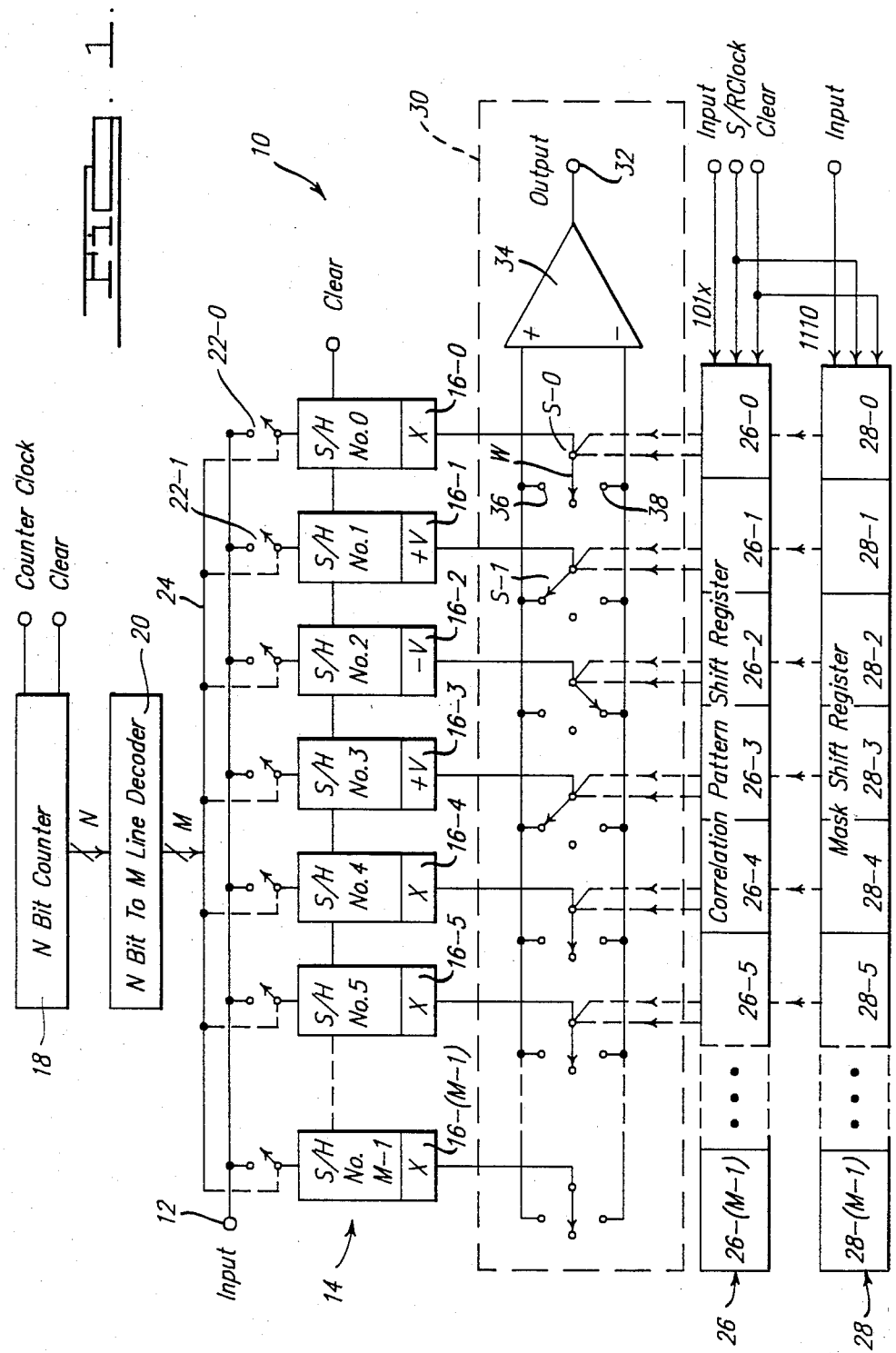
FIG. 1 is a schematic diagram of an analog-digital correlator made in accordance with the teachings of the present invention.

Correlator 10 includes a nonserial analog memory 14 for directly storing samples of the received analog signal. In a preferred embodiment, the analog memory 14 consists of a plurality of sample and hold (S/H) circuits 16-0 to 16-(M−1). Although the number of sample and hold circuits 16 can vary, the number of sample and hold circuits in this particular example is 40. Sample and hold circuits 16 are generally of a conventional construction and, as known in the art, serve to store a voltage level in a memory (generally a capacitive memory) therein which corresponds with the voltage level of the received sample. The stored voltage memory level in the memory can be nondestructively read out for further analysis. In FIG. 1, the memories of each of the sample and hold circuits are diagrammatically illustrated as the lower portion of the sample and hold block diagram.

Means are provided for directly storing the analog signal samples into the sample and hold memories. By directly storing we mean that there is no intermediate shifting of the analog signal as, for example, employed by CCD memories but, instead, the signal is loaded directly into the sample and hold memory and it stays there. Various techniques can be employed to accomplish this result. In the preferred embodiment, a multi-bit counter 18 and decoder 20 cooperate to sequentially address each of the sample and hold circuits 16-0 to 16-(M−1). Preferably, the counter clock input to counter 18 is synchronized with the digital code generator that originally impressed the code onto the transmitted radar signal. Consequently, the received analog signal is sampled at the same bit rate as the impressed code. In the preferred embodiment, counter 18 is a six-bit counter and decoder 20 is a six-bit to 40-line decoder.

In operation, when the received signal on input line 12 exceeds a predetermined threshold, counter clock pulses are applied so that the counter/decoder combination first activates the input to sample and hold circuit 16-0 on the first clock pulse. This is diagrammatically illustrated by switch 22-0 which is coupled to an address bus 24 which, in turn, is connected to an output of decoder 20. Thus, decoder 20 places the appropriate address on bus 24 to cause switch 22-0 to close during the first clock pulse. This enables sample and hold circuit 16-0 to store the voltage level of the analog signal on input line 12 at that time into the sample and hold memory. During the second counter clock pulse, the decoder 20 opens switch 22-0 but closes the next sample and hold switch 22-1 so that sample and hold circuit 16-1 can sample the analog signal. This process continues until all of the sample and hold circuits have been loaded. If the received signal contains the impressed code, three sequential sample and hold memories should contain voltage levels of positive, negative, and positive polarities corresponding with the digital impressed 101 code. For purpose of explanation, we will assume that this sequence of voltage levels is stored in the memories of sample and hold circuits 16-1, 16-2 and 16-3 where the memories thereof are illustrated in FIG. 1 as containing +V, −V and +V voltage levels. The other memories of the sample and hold circuits are designated with an X.

After the analog signal of interest has been loaded into the sample and hold circuit 16 it is ready to be tested. To this end, a correlation pattern in the form of a digital signal is applied to the input of a multi-stage shift register 26. The correlation pattern applied to the input of shift register 26 is a function of the digitally impressed code on the transmitted signal. In our particular embodiment, the code contained a 101 pattern and, accordingly, the correlation pattern includes a 101 sequence. The remaining bits are zero.

The present invention also advantageously utilizes a mask shift register 28 which also has a plurality of stages corresponding to the number of sample and hold circuits 16 as is also the case with shift register 26. The digital mask pattern applied to the input of shift register 28 is a function of the length of the digital code to be tested. In our example, the code is three bits long and accordingly, the input mask pattern includes a series of three sequential digital ones. The remaining bits are zero.

The correlation pattern and mask shift pattern are synchronously shifted through the stages of shift registers 26 and 28, respectively, by way of shift register clock pulses applied to the input labeled S/R clock. During each clock pulse a correlation sum is produced at the output of a multi-input correlation sum amplifier network generally designated by the reference numeral 30. The output 32 from the correlation sum network 30 will be a function of the sum of the values stored in each of the sample and hold circuits 16 which values will be inverted or noninverted as a function of the digital code in the shift register stage 26 associated with the particular S/H circuit 16, and as enabled or not by the associated stage in mask shift register 28.

In this embodiment, the contents of sample and hold circuit 16 will be inverted if the contents of its associated correlation pattern shift register is a digital zero. If the corresponding stage in the correlation pattern shift register 26 is a one, then the contents of sample and hold circuit will remain the same, i.e., be noninverted. Thus, the inverted or noninverted sum of all of the sample and hold circuits 16-0 to 16-(M−1) will generate the correlation sum for each clock cycle as the correlation pattern and mask patterns are shifted down shift registers 26 and 28. This is, of course, assuming that the particular sample and hold circuit 16 has been enabled by a digital one appearing in its associated mask shift register stage. A digital zero in a mask shift register stage will disable the sample and hold circuit, i.e., its value will not affect the output of the correlation sum network 30.

Figure 2:
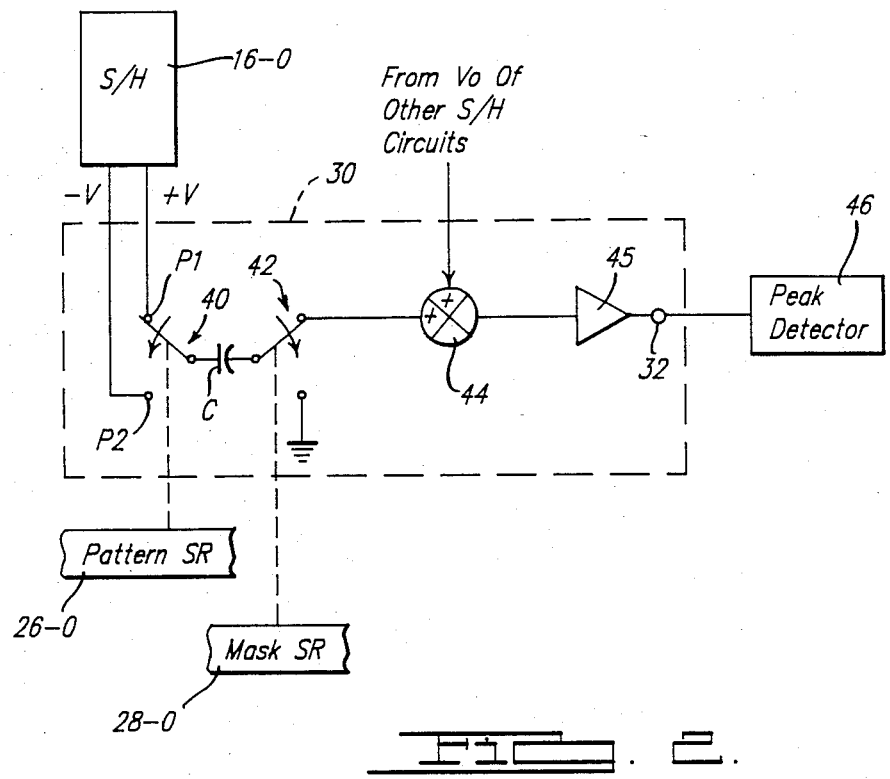
FIG. 2 is a more detailed schematic diagram illustrating the use of switched-capacitor circuitry for carrying out the preferred embodiment of this invention.

FIG. 1 illustrates these functions diagrammatically in order to aid in the understanding of the operation of this invention. On the other hand, FIG. 2 illustrates the presently-preferred construction. With respect to FIG. 1, it illustrates a three-pole switch S-0 to S-(M−1) for each sample and hold circuit 16. One pole 36 of the switches is connected to a noninverting (+) input of an op-amp 34. Another pole 38 is connected to an inverting input (−) of op-amp 34. The other pole 40 is not connected to either input of op-amp 34. When the digital signal in the stage of correlation pattern shift register 26 is a one, this causes the switch wiper (w) to connect to pole 36. As a consequence, the contents of the sample and hold memory 16 is coupled through wiper W and pole 36 to the noninverting input of op-amp 34. On the other hand, if the correlation pattern bit is a digital zero, wiper W would be connected to pole 38 thereby connecting the output of sample and hold circuit 16 to the inverting output of op-amp 34. Finally, if the state of the bit in mask shift register 28 is a digital zero, wiper W would be placed in the neutral position (connected to pole 40) and thereby the associated sample and hold circuit would not be connected to either of the inputs to op-amp 34 and the S/H value would not effect the correlation sum.

FIG. 2 illustrates the presently preferred construction for performing these functions. This construction utilizes a switched-capacitor technique. Each sample and hold circuit 16 provides two outputs corresponding to the contents of the memory (+V) and the inversion (−V) thereof. These outputs are connected to two poles P1, P2 of a switch 40 which is coupled through a capacitor C to another switch 42. Switches 40, 42 preferably are implemented as CMOS transistors using standard CMOS processing techniques. By changing the phase of switches 40 and 42, it is possible to either invert or noninvert the contents of the sample and hold circuit 16.

Briefly, the inverted/noninverted output $V_o$ for each S/H circuit 16 is generated as follows. When switches 40 and 42 are both down (wiper of switch 40 coupled to pole P2 and the wiper of switch 42 being coupled to ground), the input plate of capacitor C is coupled to −V and the output plate is set to ground. When switches 40 and 42 are both up, the input plate discharges to +V and the output plate voltage becomes +V-(−V) = +2 V due to charge inversion across the capacitor C. Thus, the contents of sample and hold memory 16-0 is noninverted and an associated output ($V_o$) is coupled to a summation node 44 together with the outputs from the other sample and hold circuits 16-1 to 16-(M−1). This correlation sum can be appropriately amplified at 45 and fed to a peak detector 46.

To invert the sample and hold memory contents, the following is carried out. Switch 40 is set to the up position and switch 42 is set to the down position. As a result, the input plate of capacitor C is charged to +V and the output plate is set to ground. Then, switch 40 is set to a down position causing the input plate of the capacitor to discharge to −V. This causes the output plate voltage to become −V-(+V)=−2 V. Consequently, the output ($V_o$) of sample and hold circuit 16 has effectively been inverted.

Figure 3:
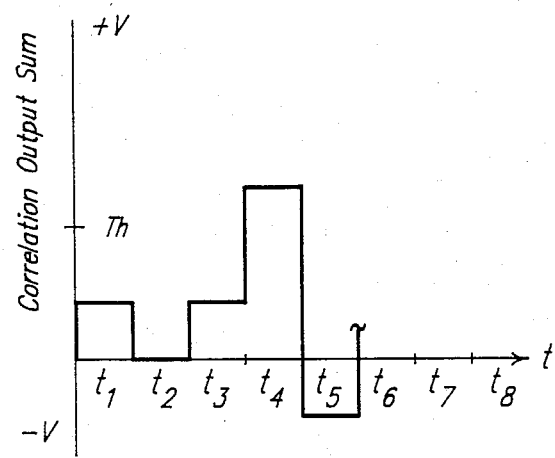
FIG. 3 is a timing chart illustrating the output of the cross-correlation summing network in a specific example.

Returning now to our original example, the remaining correlation operation will be now explained. In addition, let us assume that the contents of sample and hold circuit 16-0 is a positive voltage (+V) and that the digital bits applied to the inputs of registers 26 and 28 are as shown in FIG. 1. During the first shift register clock period $t_1$, a digital one resides in correlation pattern shift register stage 26-0 and a one resides in mask shift register 28-0. This causes the +V contents in sample and hold circuit 16-0 to be noninverted and enabled. Since the other sample and hold circuits are not yet enabled, the correlation output sum becomes a +V for time $t_1$ as illustrated in the waveform of FIG. 3.

During the next shift register clock cycle, stage 26-1 now contains a digital one, stage 26-0 contains a digital zero, and stage 28-1 contains a one as does stage 28-0. Now, the contents of sample and hold circuits 16-0 is inverted (due to the zero in stage 26-0) while the +V contents of sample and hold circuit 16-1 is not inverted thereby resulting in a net correlation sum of zero for time $t_2$. At time $t_3$, sample and hold circuit 16-2 is not inverted (thereby remaining −V) whereas sample and hold 16-1 is inverted but sample and hold 16-0 is not thereby generating a correlation output sum at time $t_3$ of +V. At time $t_4$ sample and hold circuit 16-0 now becomes disabled due to the zero in stage 28-0. The only active stages are sample and hold circuits 16-1, 16-2 and 16-3 which contain the digital code of interest. At this time the correlation output sum now peaks because the digital code in the correlation pattern shift register is properly "aligned" with the corresponding analog signal samples in the sample and hold circuit 16. At time $t_4$ the digital one in stage 26-3 causes sample and hold 16-3 to not be inverted, the Zero in stage 26-2 causes the −V voltage in sample and hold 16-2 to now become a positive value which is added together with the noninverted +V voltage in sample and hold circuit 16-1 due to the one in stage 26-1. The resultant peak can be detected by suitable peak detector 46 circuitry and utilized for various purposes well known in the art. In our radar example, the range of the target can, for example, now be determined utilizing well known processing techniques.

Continuing our example for one more time step, assume that sample and hold circuit 16-4 contains a +V voltage. Thus, at time $T_5$ the correlation output becomes a −1 since sample and hold circuit 16-4 is not inverted, sample and hold 16-3 is inverted and the −V voltage in sample and hold 16-2 is not inverted.

This process continues with the correlation pattern and the mask pattern being shifted throughout the remaining stages of shift registers 26 and 28, respectively.

Several advantages are derived from the technique of this invention. The sampled analog signal can be tested against a wide variety of different correlation patterns merely by applying a different bit pattern to the correlation pattern shift register and to the mask register, as needed. Since the analog signal is effectively stationarily held in the memory 14 while the digital correlation code is shifted relative to it, the analog samples are not degraded by multiple transfers as would be the case if the analog signal, instead of the digital signal, is shifted. Although the detailed implementation of this invention can take many forms, a significant advantage is that it can be fabricated on one or a few monolithic integrated circuit manufactured by existing, widely available integrated circuit fabrication processes. Compared to other implementations of a cross-correlator, this invention can provide low cost, compact, and highly producible implementations.

Still other advantages will become apparent to those skilled in the art, as will alternative implementations. For example, the analog memory 14 can be provided with full random access addressing instead of the essentially "hard wired" approach provided by counter 18 and decoder 20. Other types of digital sequencing techniques other than the shift register implementation can also be used such as coupling a shift register function with a digital random access memory (RAM). Other approaches can use some other form of tapped digital shift register, such as a charge transfer device like a CCD or a bucket brigade. It is also possible for the correlation pattern to more closely represent an analog pattern instead of the three programmable values provided by way of the preferred embodiment. If so, the correlation sum amplifier should have a greater number of programmable gain values. One possible approach would be to use a multiplying digital-to-analog converter as a programmable gain input for each input of a summing amplifier. Another approach would use a specially designed summing amplifier with each input programmable only for the gain values that are needed in the particular application.

Still other modifications will become apparent to those skilled in the art after reading the foregoing specification, drawings and following claims.

What is claimed is:

1. In a radar system wherein an analog signal having a digitally-impressed code thereon is transmitted and a cross correlator is used to determine if a received echo analog signal contains said code, the improvement comprising:

a plurality of selectively addressable sample and hold circuits;

an input line for receiving said echo analog signal;

loading means including a counter and decoder for sequentially addressing the sample and hold circuits at the same clock rate used to impress the code onto the transmitted signal whereby said sample and hold circuits store sample values of the received analog signal, the sample and hold circuits providing a positive and negative voltage level output proportional to the sampled analog signal value stored therein;

a switched capacitor network associated with each sample and hold circuit, said network including a first switch means for connecting said positive or negative voltage from the sample and hold circuit to one plate of a capacitor, the other plate of the capacitor being connected to a second switch having one pole connected to a summing node and another pole connected to ground;

a correlation pattern shift register having a plurality of stages each associated with one of the sample and hold circuits;

a mask shift register having a plurality stages each associated with one of said sample and hold circuits;

input means for loading the pattern shift register with a plurality of pattern bits;

input means for loading the mask register with a plurality of mask bits;

the state of the pattern bits controlling the first switch, with the mask bits controlling the second switch;

means for simultaneously shifting the pattern bits and mask bits through the stages of the correlation pattern shift register and mask shift register, respectively; and whereby the summing node provides a correlation output sum.

* * * * *